(12) United States Patent
Arai

(10) Patent No.: US 6,285,643 B1
(45) Date of Patent: *Sep. 4, 2001

(54) DISK CARTRIDGE, DISK DRIVING DEVICE USING DISK CARTRIDGE, AND STORAGE SYSTEM COMPRISING DISK CARTRIDGE AND DISK DRIVING DEVICE

(75) Inventor: Shizuo Arai, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,954

(22) Filed: Jan. 7, 1998

(30) Foreign Application Priority Data

Jan. 10, 1997 (JP) .................................. 9-003336

(51) Int. Cl.[7] .......................... G11B 17/04; G11B 33/04
(52) U.S. Cl. ........................... 369/77.2; 369/75.2
(58) Field of Search .................. 369/75.1–77.2

(56) References Cited

U.S. PATENT DOCUMENTS

| | | | |
|---|---|---|---|
| 4,710,910 | * | 12/1987 | Ejiri ........................... 369/75.2 |
| 4,815,065 | * | 3/1989 | Rouws ......................... 369/77.2 |
| 5,142,523 | * | 8/1992 | Kamoshita ................... 369/75.2 |
| 5,577,014 | * | 11/1996 | Kawamura .................... 369/77.2 |
| 5,737,293 | * | 4/1998 | Kawamura et al. .......... 369/77.1 |
| 5,901,129 | * | 5/1999 | Takahashi et al. ........... 369/75.2 |

FOREIGN PATENT DOCUMENTS

| | | | |
|---|---|---|---|
| 8-087854 | * | 4/1996 | (JP) . |
| 8-195013 | * | 7/1996 | (JP) . |
| 8-195014 | * | 7/1996 | (JP) . |

* cited by examiner

Primary Examiner—William Klimowicz
(74) Attorney, Agent, or Firm—Oblon, Spivak, McClelland, Maier & Neustadt, P.C.

(57) ABSTRACT

A disk cartridge can be stably loaded on a cartridge compartment without impairing the external appearance of the disk cartridge and without increasing the size of the compartment more than needed. A cartridge housing has cutout recesses (gripper slots) in the side face thereof. In these cutout recesses are provided cartridge holding recesses. When the cartridge is loaded in the cartridge compartment of the disk driving device, the cartridge holding claws provided on the cartridge loading section of the cartridge compartment are engaged with the recesses, thereby stably holding the cartridge on the compartment. The cartridge holding claws may be provided on the cartridge compartment so as not to protrude out of the cutout recesses when viewed from above, whereby an increase in the size of the cartridge compartment more than needed can be prevented.

2 Claims, 10 Drawing Sheets

FRONT ← → REAR

FIG. 13
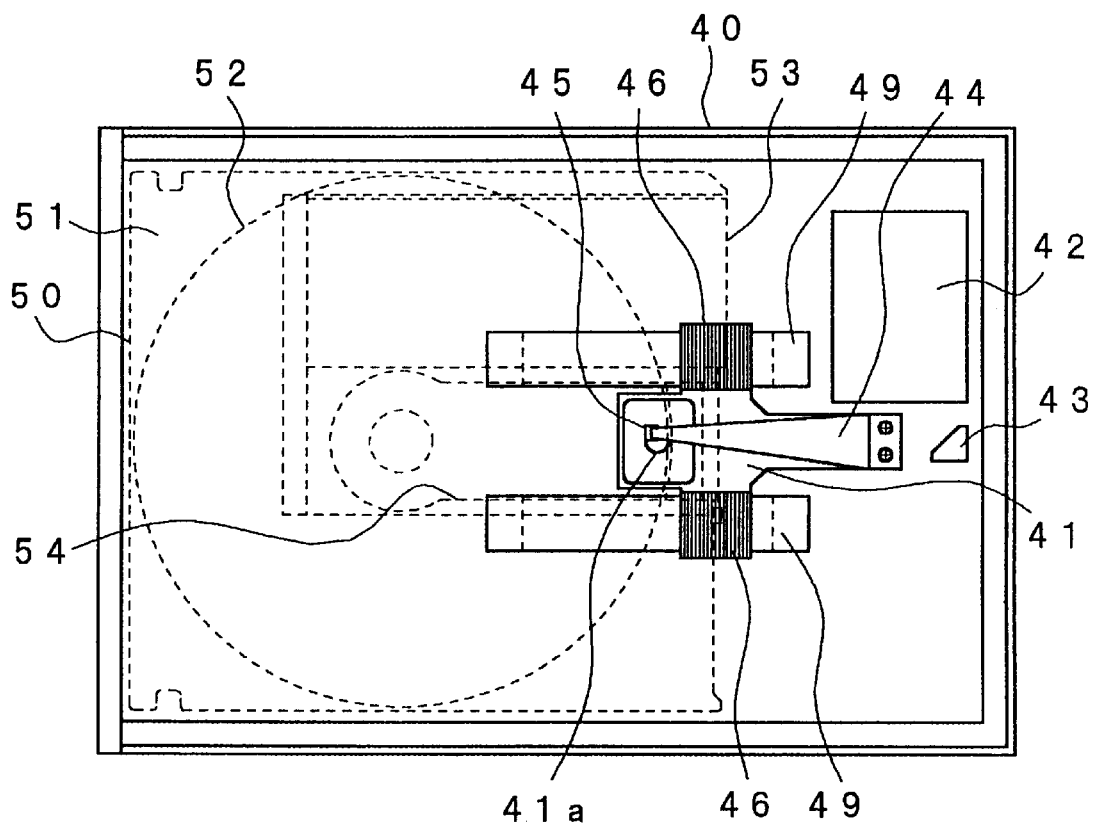
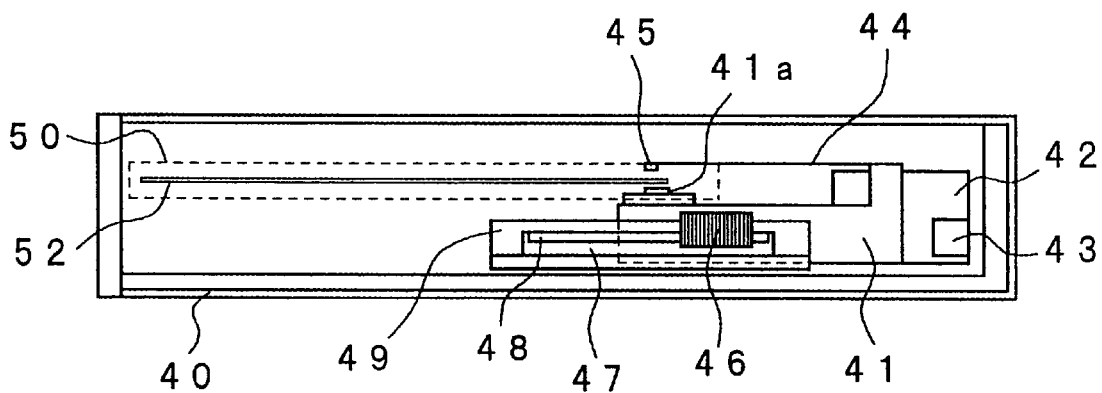

DISK CARTRIDGE, DISK DRIVING DEVICE USING DISK CARTRIDGE, AND STORAGE SYSTEM COMPRISING DISK CARTRIDGE AND DISK DRIVING DEVICE

BACKGROUND OF THE INVENTION

1. Field of the Invention

The present invention relates to a disk cartridge and a disk driving device using the disk cartridge, and more particularly, to a disk cartridge, etc. for holding the disk cartridge stably on a cartridge compartment without impairing the external appearance of the disk cartridge and without increasing the size of the cartridge compartment more than needed, by providing a cartridge engaging recess or projection in or on at least one surface which constitutes a cutout recess formed in a cartridge housing.

2. Description of the Related Art

A disk driving device, such as a cartridge compartment loading type disk driving device, is known in prior art, in which a disk cartridge loaded in a cartridge compartment is drawn into the device.

In this type of disk driving device, it becomes necessary to hold a disk cartridge on a cartridge compartment in order to prevent upward and downward movement of the disk cartridge when vertically mounting the disk cartridge.

In the prior art disk cartridge, it has been proposed to provide a recess (a slot) in the rear part of the disk cartridge in order to hold the disk cartridge on the cartridge compartment by using the recess. FIG. 9 shows a disk cartridge 10 of this type.

The disk cartridge 10 is comprised of a cartridge housing 11, a photo-magnetic disk 12 rotatably housed in a disk housing chamber formed within the cartridge housing 11, and a slide shutter 14 for opening and closing a head access window 13 formed in the upper and lower surfaces of the cartridge housing 11. The head access window 13 in the upper surface is for the insertion and removal of a magnetic application head, and the head access window 13 in the lower surface is for the insertion and removal of an optical head and a turntable.

On the slide shutter 14 a slide guide member 15 is fixed, extending in the direction in which the shutter is closed, and between the slide guide member 15 and the cartridge housing 11 is disposed an unillustrated torsion coil spring for pressing the slide shutter 14 in the direction in which the shutter is closed. When the disk cartridge 10 loaded in the cartridge compartment is drawn into the body of the disk driving device as described later, the slide guide member 15 is pushed towards opening the shutter, thereby moving the slide shutter 14 to open the head access window 13.

In the side surfaces 16 and 17, on the rear face 18 side, of the cartridge housing 11, in a jukebox for example, cutout recesses 16a and 17a called gripper slots are provided for the purpose of facilitating the replacement of the disk cartridge 10. And in two places in both ends of the rear face 18 of the cartridge housing 11 are provided recesses 18a and 18b for cartridge engagement.

FIG. 10 shows a cartridge compartment 20 of a disk driving device in which the aforementioned disk cartridge 10 is loaded. The cartridge compartment 20 has a cartridge loading section 24 enclosed with rear plates 21a and 21b, a side surface plate 22a, a side surface plate 22b, and front plates 23a and 23b. The cartridge loading section 24 is provided with an opening 25 of specific width extending from the central part to the rear side. When the disk cartridge 10 is loaded in the cartridge loading section 24, the head access window 13 in the lower surface of the disk cartridge 10 faces the opening 25.

On the front plates 23a and 23b enclosing the cartridge loading section 24, cartridge holding claws 26a and 26b are provided, projecting towards the interior of the cartridge loading section 24. When the disk cartridge 10 is loaded in the cartridge loading section 24, the cartridge holding claws 26a and 26b are inserted in the recesses 18a and 18b provided in the rear face 18 of the cartridge housing 11.

At the center of the rear side of the cartridge loading section 24 the rear plates 21a and 21b are not provided, but a cartridge pushing mechanism 27 is provided in that part. The cartridge pushing mechanism 27 is composed of a U-shaped pushing member 28 and compression coil springs 30a and 30b mounted in the spring holders 29a and 29b provided on the front face side of the cartridge compartment 20. In this case, the two legs 28a and 28b of the pushing member 28 are inserted into the spring holders 29a and 29b through the openings 31a and 31b formed in one end side of the spring holders 29a and 29b, thus being held in contact with one end of the compression coil springs 30a and 30b.

The loading of the disk cartridge 10 to the cartridge loading section 24 of the aforesaid cartridge compartment 20 is carried out with the pushing member 28 moved to the rear side of the cartridge loading section 24, that is, with the compression coil springs 30a and 30b compressed. FIG. 11 shows the disk cartridge 10 as-loaded in the cartridge loading section 24. In this case, when the cartridge holding claws 26a and 26b provided on the front plates 23a and 23b of the cartridge compartment 20 are inserted in the recesses 18a and 18b formed in the rear face 18 of the cartridge housing 11, the front face of the cartridge housing 11 is pressed against the front face side of the cartridge loading section 24 by the pushing member 28 with a force of the compression coil springs 30a and 30b, thereby holding the disk cartridge 10 with stability in the cartridge loading section 24 of the cartridge compartment 20.

At the center of the front face side of the cartridge loading section 24 the front plates 23a and 23b are not provided. In this position there is provided a cutout recess 32. The cutout recess 32 is provided to facilitate the removal by a user of the disk cartridge 10 loaded in the cartridge loading section 24. The removal of the disk cartridge 10 is done by reversing the procedure of loading.

In the disk cartridge 10 in which the recesses 18a and 18b are provided in the rear face 18 of the cartridge housing 11 of the disk cartridge 10 as previously stated to thereby hold the disk cartridge 10 stably in the cartridge loading section 24 of the cartridge compartment 20 by using the recesses 18a and 18b, the cartridge holding claws 26a and 26b are protrusively provided towards the interior of the cartridge loading section 24 on the front plates 23a and 23b of the cartridge compartment 20. Therefore, to load the disk cartridge 10 on the cartridge compartment 20 of the disk driving device, first the user mounts the cartridge 10 on the cartridge loading section 24 while manually pushing the cartridge 10 in towards the rear against the spring force of the coil springs 30a and 30b. Subsequently, as the user takes his hand off the cartridge 10 while loading it on the cartridge loading section 24, the cartridge 10 is pressed towards the front by the spring force of the coil springs 30b and 30a, thus being moved towards the front. Therefore the cartridge holding claws 26a and 26b come into engagement with the recesses 18a and 18b provided in the rear face 18 of the cartridge housing 11, thereby mounting the cartridge 10 on the cartridge compartment 20.

It is, therefore, necessary to design the longitudinal length of the cartridge loading section 24 of the cartridge compartment 20 longer than the longitudinal length of the disk cartridge 10 by the amount of stroke through which the cartridge is moved by the spring force of the coil springs 30b and 30a. Thus the length of the cartridge compartment 20 will be increased in the longitudinal direction, with the result that the disk driving device body will become larger by that.

By the way, it is desirable that the disk driving device be built smaller because the device is mounted in other equipment such as a computer. However, in the photo-magnetic disk driving device of a magnetic modulation system, the magnetic application head and the optical head are linked in opposite positions in a U form so as to move simultaneously. Therefore there is provided a large space on the rear side of the disk driving device body. It is conceivable that the space at the front side of the disk driving device body is possibly restricted to reduce the size of the disk driving device body; it is, therefore, necessary to decrease the length in the longitudinal direction of the cartridge compartment on which the disk cartridge is mounted.

FIGS. 12 and 13 schematically show, in a photo-magnetic disk driving device 40, the magnetic application head and the optical head that have moved to the innermost and outermost peripheral positions of the photo-magnetic disk.

In the photo-magnetic disk driving device 40 a disk cartridge 50 is inserted. A photo-magnetic disk 52 is rotatably housed in the disk housing chamber of the cartridge housing 51 of the disk cartridge 50. In this case, the slide shutter 53 has been moved to open the head access window 54.

The optical head has a movable optical system 41 provided with an objective lens 41a, and a fixed optical system 42 provided with a semiconductor laser, a photo detector, etc., being formed as a separate optical system. Between the movable optical system 41 and the fixed optical system 42, the laser beam travels through a reflective mirror 43 disposed on the rear face side of the device body.

On the rear face side of the movable optical system 41 the base end of the head arm 44 is connected; and on the forward end of the head arm 44 a magnetic application head 45 is attached. The magnetic application head 45 and the optical head (the objective lens 41a) are oppositely linked in a U form so as to move simultaneously.

On both sides of the movable optical system 41 the coils 46, 46 are protrusively fixed. The coils 46, a center yoke 47, a magnet 48, and a side yoke 49 make up a linear motor, whereby the movable optical system 41 and the magnetic application head 45 are movable in the radial direction of the photo-magnetic disk 52.

As shown in FIG. 13, there is provided a large space on the rear face side of the device body so that the movement of the movable optical system 41 and the magnetic application head 45 will not be disturbed by the reflective mirror 43 or other.

Furthermore, in the device having the recesses 18a and 18b in the rear face 18 of the cartridge housing 11 of the disk cartridge 10, which is securely held in the cartridge loading section 24 of the cartridge compartment 20 by using the recesses 18a and 18b as described above, the recesses 18a and 18b are formed in the rear face 18 which constitutes the outermost shape of the disk cartridge 10, impairing the external appearance of the disk cartridge 10.

SUMMARY OF THE INVENTION

It is, therefore, an object of the present invention to provide a disk cartridge which can be held stably in the cartridge compartment without impairing the external appearance of the disk cartridge and moreover without increasing the size of the cartridge compartment more than needed.

The disk cartridge of the present invention has cutout recesses in the cartridge housing and is provided with a cartridge engaging recess or projection in at least one surface which constitutes the cutout recess.

Furthermore, the disk driving device of the present invention is designed to draw the disk cartridge loaded in the cartridge compartment into the device body, in which the disk cartridge has a cutout recess in the cartridge housing, and a cartridge engaging recess or projection is provided in or on at least one surface which constitutes the cutout recess; and a cartridge holding means is provided on the cartridge compartment for engaging with a recess or projection of the disk cartridge loaded in the cartridge compartment to hold the disk cartridge.

The cartridge housing constituting the disk cartridge has a cutout recess. The cutout recess is provided in the side and rear faces of the cartridge housing, and may be, for instance, a gripper slot provided in the side surface. In or on at least one surface of the cutout recess are provided the cartridge engaging recess or projection. When the disk cartridge is loaded in the cartridge compartment, the cartridge holding means provided on the cartridge compartment is engaged with the recess or projection of the disk cartridge, thereby stably holding the disk cartridge.

In this case, the recess in or the projection on the disk cartridge is provided in the cutout recess of the cartridge housing; and the cartridge holding means can be provided in the cartridge compartment so that it will never project out of the cutout recess when viewed from above.

The above and other objects, features and advantages of the present invention will become clearer from the following description with reference to the accompanying drawings.

BRIEF DESCRIPTION OF THE DRAWINGS

FIG. 13 is a schematic view showing, in the photo-magnetic disk driving device, the magnetic application head and the optical head that have moved to the outermost peripheral position of the photo-magnetic disk.

DETAILED DESCRIPTION OF THE PREFERRED EMBODIMENTS

Figure 1:
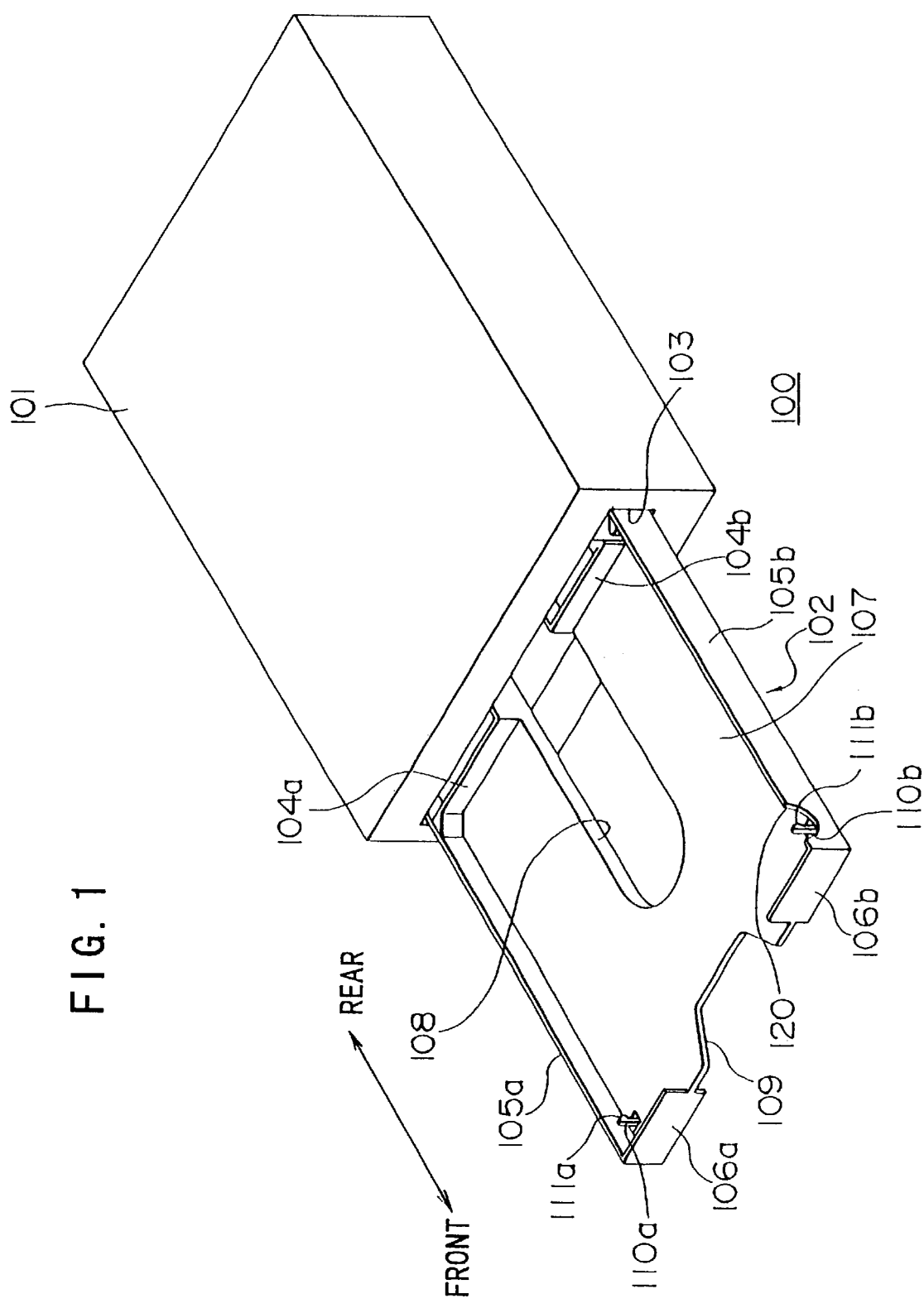
FIG. 1 is a perspective view showing the constitution of a photo-magnetic disk driving device of the embodiment.

Preferred embodiments of the present invention will hereinafter be explained with reference to the accompanying drawings. FIG. 1 shows a photo-magnetic disk driving device 100 of one embodiment.

First, a disk cartridge 200 in which a photo-magnetic disk is rotatably housed and mounted in the photo-magnetic disk driving device 100 will be explained by referring to FIG. 2.

The disk cartridge 200 is comprised of a cartridge housing 201, a photo-magnetic disk 202 rotatably housed in a a disk housing chamber formed within the cartridge housing 201, and a slide shutter 204 which slides to open and close a head access window 203 formed in the upper and lower surfaces of the cartridge housing 201. The head access window 203 in the upper surface is for inserting and removing the magnetic application head, while the head access window 203 in the lower surface is for inserting and removing the optical head and the turntable.

At the slide shutter 204 a slide guide member 205 is fixed extending in the direction in which the shutter is closed, and between the slide guide member 205 and the cartridge housing 201 is interposed an unillustrated coil spring which presses the slide shutter 204 towards closing the shutter. When the disk cartridge 200 as-loaded in the cartridge compartment is drawn into the disk driving device body as described later, the slide guide member 205 is pushed towards opening the shutter, thus moving the slide shutter 204 to open the head access window 203.

On the rear face 208 side of the side surfaces 206 and 207 of the cartridge housing 201, there are provided cutout recesses 206a and 207a which are termed gripper slots. The gripper slots are cutout recesses provided for gripping and catching, at the time of replacement, the cartridge by a cassette take-out arm provided within the cassette changer, for instance an automatic cassette changer in a jukebox or other. In the present embodiment the cartridge engaging recesses 206b and 207b are provided in one surface, for instance the front face, which forms the cutout recesses 206a and 207a.

Next, the photo-magnetic disk driving device 100 shown in FIG. 1 will be explained. The photo-magnetic disk driving device 100 is comprised of a disk driving device body 101 and a cartridge compartment 102. The cartridge compartment 102 is drawn into the disk driving device body 101 through the compartment insertion port 103 provided in the disk driving device body 101. The cartridge compartment 102 is moved back and forth by means of an unillustrated compartment driving mechanism provided inside the disk driving device body 101.

The cartridge compartment 102 has a cartridge loading section 107 enclosed by rear plates 104a and 104b, a side plate 105a, a side plate 105b, and front plates 106a and 106b. The longitudinal and lateral lengths of the cartridge loading section 107 are nearly the same as the longitudinal and lateral lengths of the above-described disk cartridge 200.

The cartridge loading section 107 is provided with an opening 108 of a specific width extending to the rear side from the central portion. When the disk cartridge 200 is loaded in the cartridge loading section 107, the head access window 203 in the lower surface of the disk cartridge 200 will surface the opening 108.

At the center of the front side of the cartridge loading section 107 the front plates 106a and 106b are not provided; the cutout recess 109 is provided in the position. The cutout recess 109 is provided to facilitate the removal by the user of the disk cartridge 200 from the cartridge loading section 107.

On both the right and left ends of the front of the cartridge loading section 107 cartridge holding claws 110a and 110b are protrusively provided as cartridge holding means. The cartridge holder claws 110a and 110b are formed integrally with the cartridge compartment 102, and have a mold hinge spring structure. Therefore the engaging portions 111a and 111b at the forward ends of the cartridge holding claws 110a and 110b are movable to the front side of the cartridge loading section 107 against the spring force of the cartridge holding claws 110a and 110b.

Figure 3:
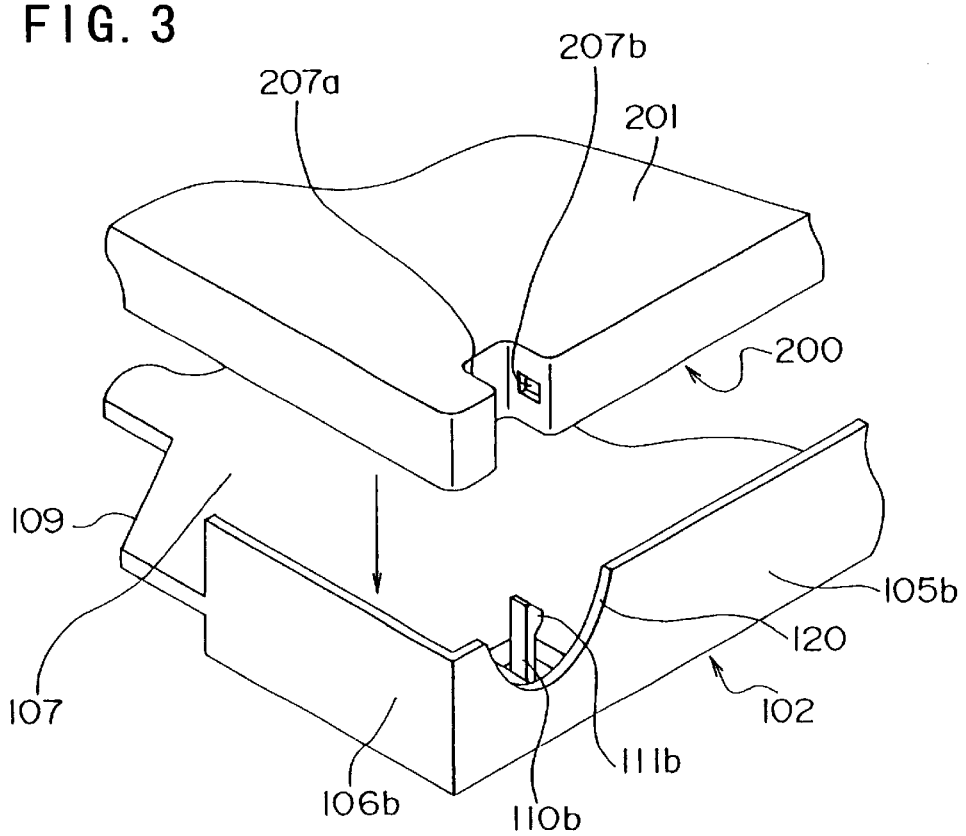
FIG. 3 is a view showing a positional relation between the cartridge holding claw of the cartridge compartment and a cutout recess of the disk cartridge.

The cartridge holding claws 110a and 110b, as shown in FIG. 3, are provided in positions corresponding to the cutout recesses (gripper slots) 206a and 207a formed in the cartridge housing 201 of the disk cartridge 200 which is loaded in the cartridge loading section 107. When the disk cartridge 200 is loaded in the cartridge loading section 107, the cartridge holding claws 110a and 110b are inserted into the cutout recesses 206a and 207a.

Figure 4A:
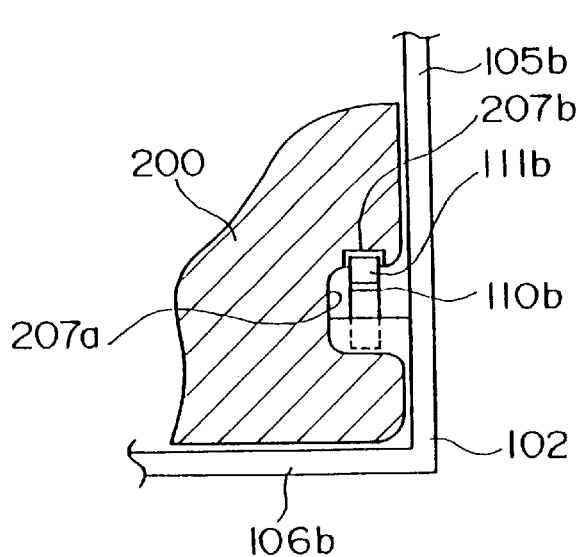
FIGS. 4A and 4B are views showing the engaged state of the cartridge holding claw with the disk cartridge loaded in the cartridge compartment.
Figure 4B:
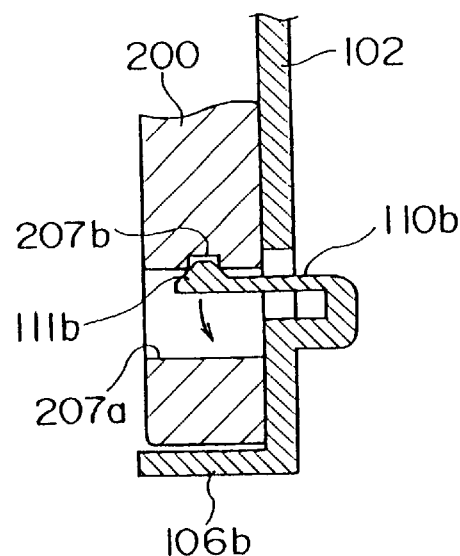

In this case, the engaging portions 111a and 111b on the tips of the cartridge holding claws 110a and 110b are pressed, until completion of the device, by the surface in which the recesses 206b and 207b of the cutout recesses 206a and 207a are formed, moving to the front side of the cartridge loading section 107. In the loaded positions facing the recesses 206b and 207b, the disk cartridge 200 is moved back to the rear side of the cartridge loading section 107 by the spring force of the cartridge holding claws 110a and 110b, thus coming into engagement with the recesses 206b and 207b. FIG. 4A is a cross sectional view showing the engaged state of the disk cartridge in the loaded state, and FIG. 4B is a longitudinal sectional view thereof. The engaging portions 111a and 111b are so formed as to have a tapered surface which becomes narrow on the side corresponding to the recesses 206b and 207b.

Figure 2:
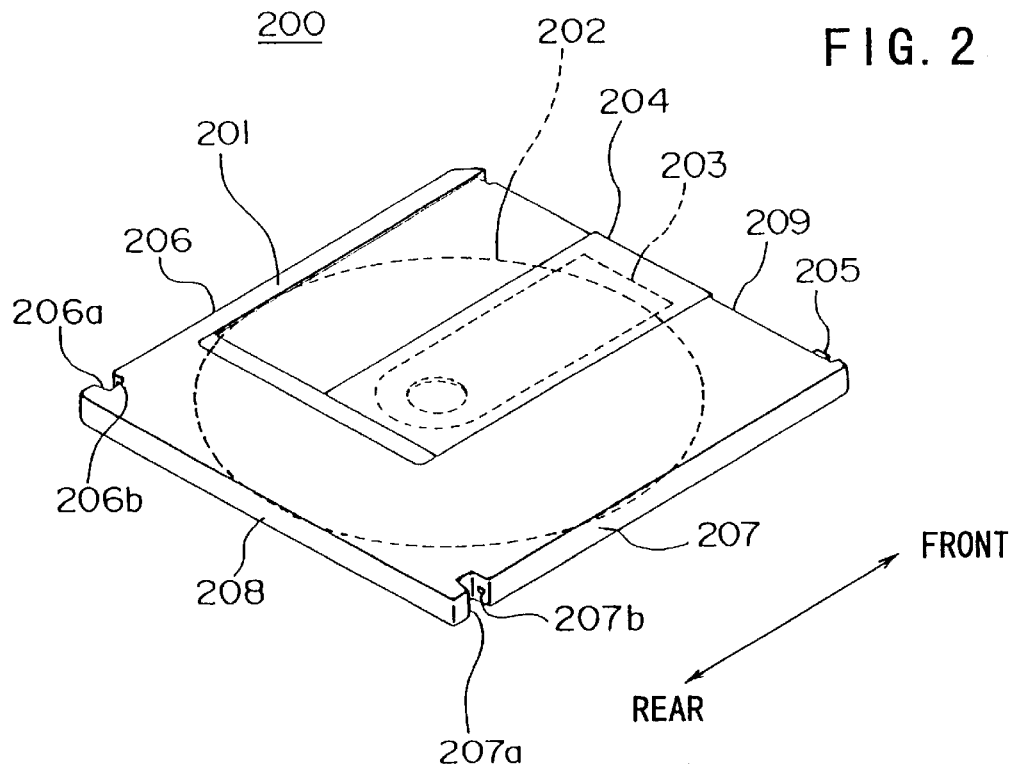
FIG. 2 is a perspective view showing the constitution of a disk cartridge loaded in the cartridge compartment of the photo-magnetic disk driving device.

In FIGS. 1 to 3, the cutout 120 seen in the side plate 105b of the cartridge compartment 102 is to allow easy view to the cartridge holding claw 110b. Actually, however, the cutout 120 is not provided.

Figure 5:
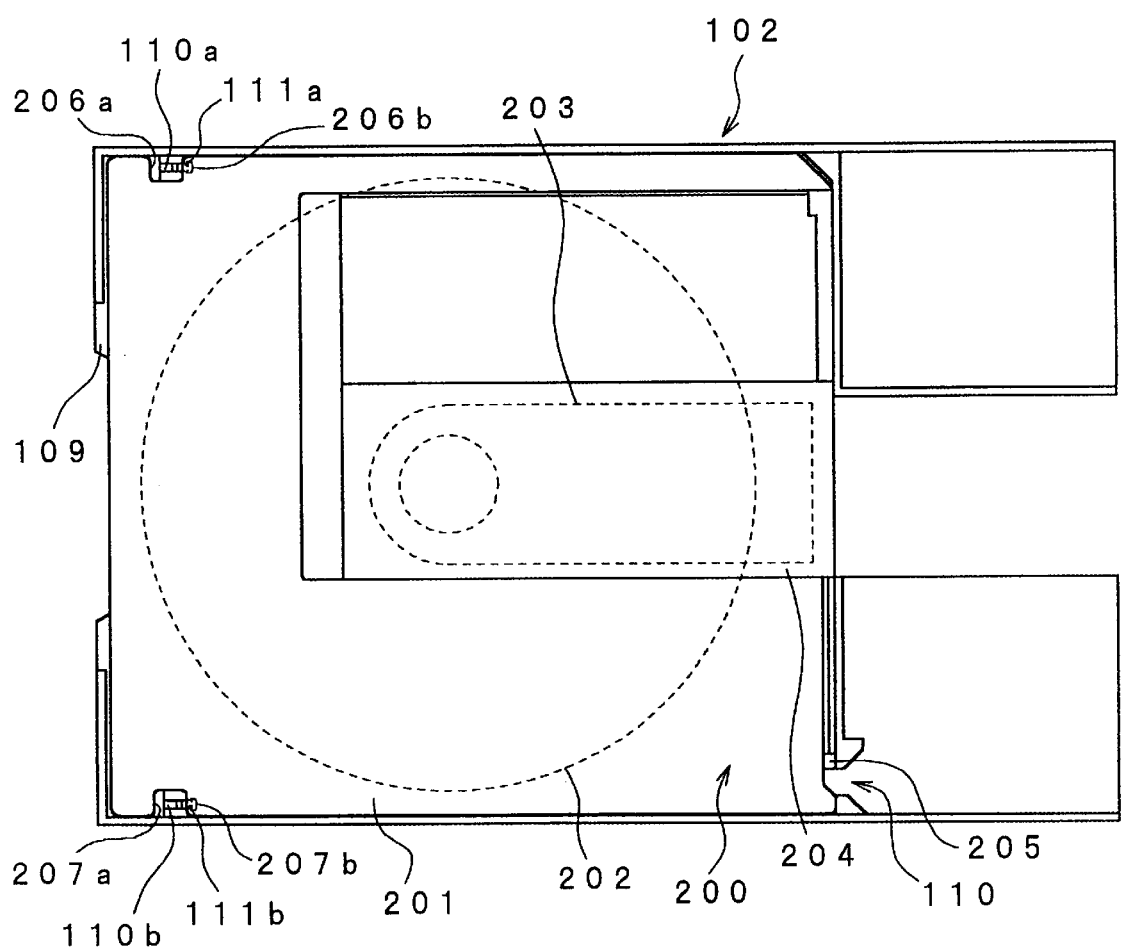
FIG. 5 is a plan view showing the disk cartridge loaded in the cartridge compartment of the disk cartridge.

When the disk cartridge 200 is loaded in the cartridge loading section 107 of the cartridge compartment 102 of the photo-magnetic disk driving device 100, it is sufficient only to push the rear side of the disk cartridge 200 downwards with the front 209 of the disk cartridge 200 held in contact with the rear plates 104a and 104b of the cartridge loading section 107. Thus the disk cartridge 200 is in the aforementioned loaded state. FIG. 5 shows the disk cartridge 200 loaded in the cartridge loading section 107.

In this case, the engaging portions 111a and 111b on the tips of the cartridge holding claws 110a and 110b protrusively provided on the front side of the cartridge loading section 107 of the cartridge compartment 102 are engaged with the recesses 206b and 207b provided in the cutout recesses (gripper slots) 206a and 207a of the side surfaces 206 and 207 of the cartridge housing 201. In addition, the disk cartridge 200 is pressed by the spring force of the cartridge holding claws 110a and 110b to the rear plates 104a and 104b of the cartridge loading section 107. Therefore, the disk cartridge 200 is stably held in the cartridge loading section 107 of the cartridge compartment 102.

When the disk cartridge 200 loaded in the cartridge loading section 107 of the cartridge compartment 102 is drawn into the disk driving device body 101, an unillustrated shutter opening-closing roller is inserted into a roller inserting portion 110, and the sliding guide member 205 is pressed toward opening the shutter by the shutter opening-closing roller, thus sliding the slide shutter 204 to open the head access window 203.

To remove the disk cartridge 200 from the cartridge loading section 107 of the cartridge compartment 102 as shown in FIG. 5, it suffices only to pull the rear side of the disk cartridge 200 upwards by utilizing the cutout recess 109 of the compartment 107. In this case, the engaging portions 111a and 111b on the tips of the cartridge holding claws 110a and 110b of the cartridge compartment 102 which are engaged in the recesses 206b and 207b formed in the cutout recesses (gripper slots) 206a and 207a of the cartridge housing 201 escape to the front side of the cartridge loading section 107 against the spring force, thus enabling easy removal of the disk cartridge 200.

In the present embodiment, the disk cartridge 200 is held in the cartridge loading section 107 of the cartridge compartment 102 by engaging the engaging portions 111a and 111b on the tips of the cartridge holding claws 110a and 110b protrusively provided on the front side of the cartridge loading section 107 of the cartridge compartment 102 with the recesses 206b and 207b provided in the cutout recesses (gripper slots) 206a and 207a present in the side surfaces 206 and 207 of the cartridge housing 201.

Therefore the cartridge housing 201 can be loaded from above in the cartridge loading section 107 without moving the cartridge housing 201 back and forth in the cartridge loading section 107 when loading the cartridge housing 201 from above in the cartridge loading section 107 of the cartridge compartment 102. It is, therefore, possible to make the longitudinal length of the cartridge loading section 107 of the cartridge compartment 102 nearly equal to the longitudinal length of the disk cartridge 200.

Consequently, it is possible to reduce the size of the cartridge compartment 102 and the disk driving device body 101.

Figure 9:
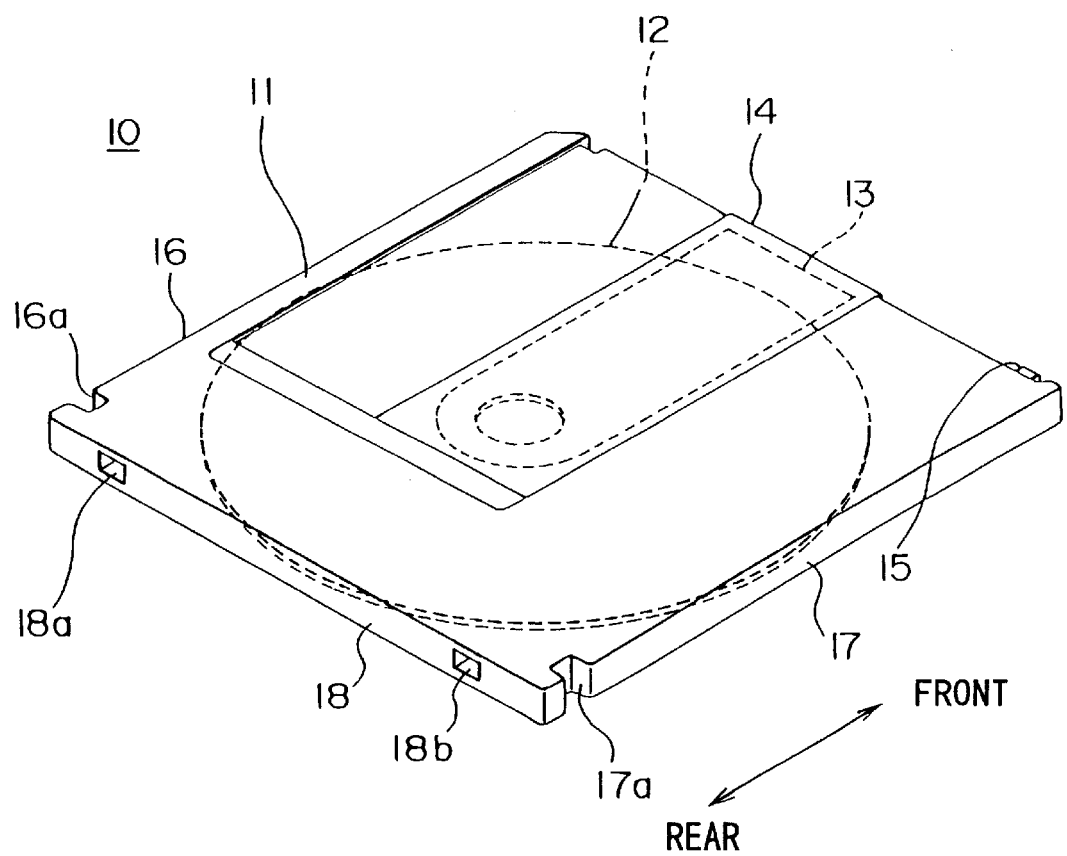
FIG. 9 is a perspective view showing the constitution of a conventional disk cartridge.
Figure 10:
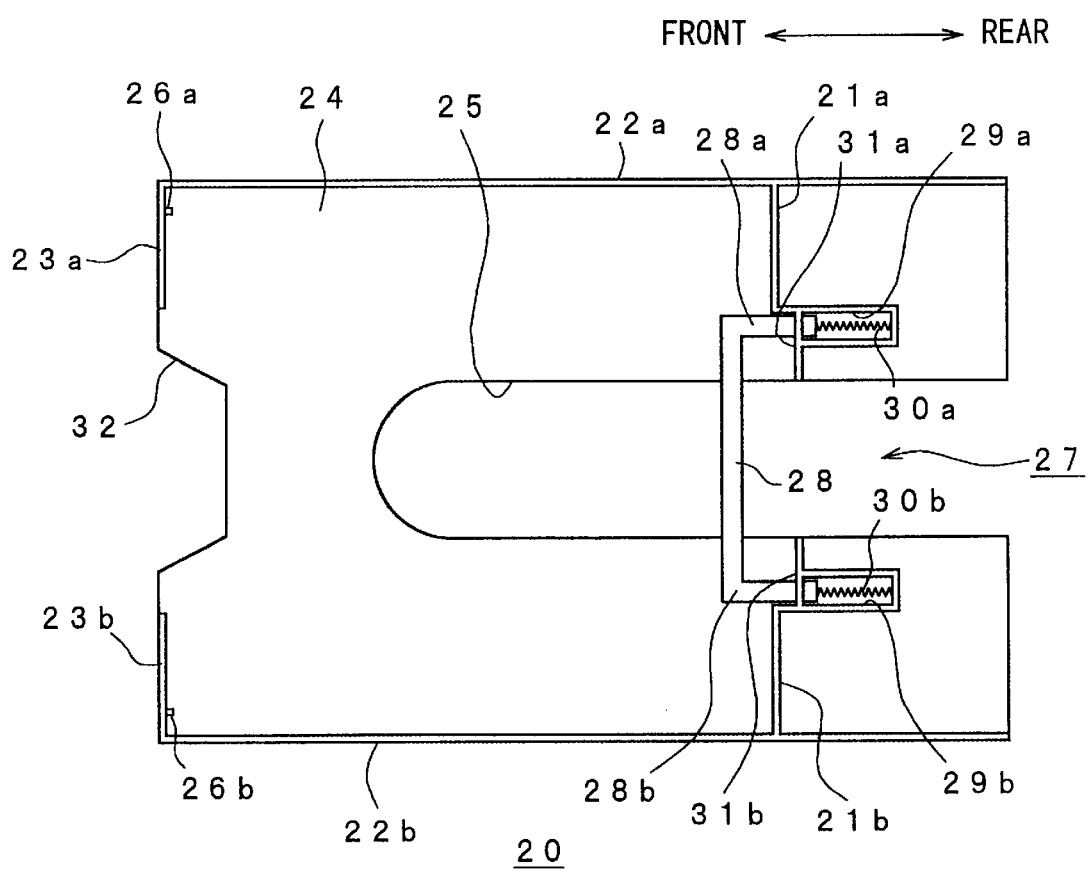
FIG. 10 is a plan view showing the constitution of the cartridge compartment of the disk driving device on which the disk cartridge shown in FIG. 9 is to be loaded.
Figure 11:
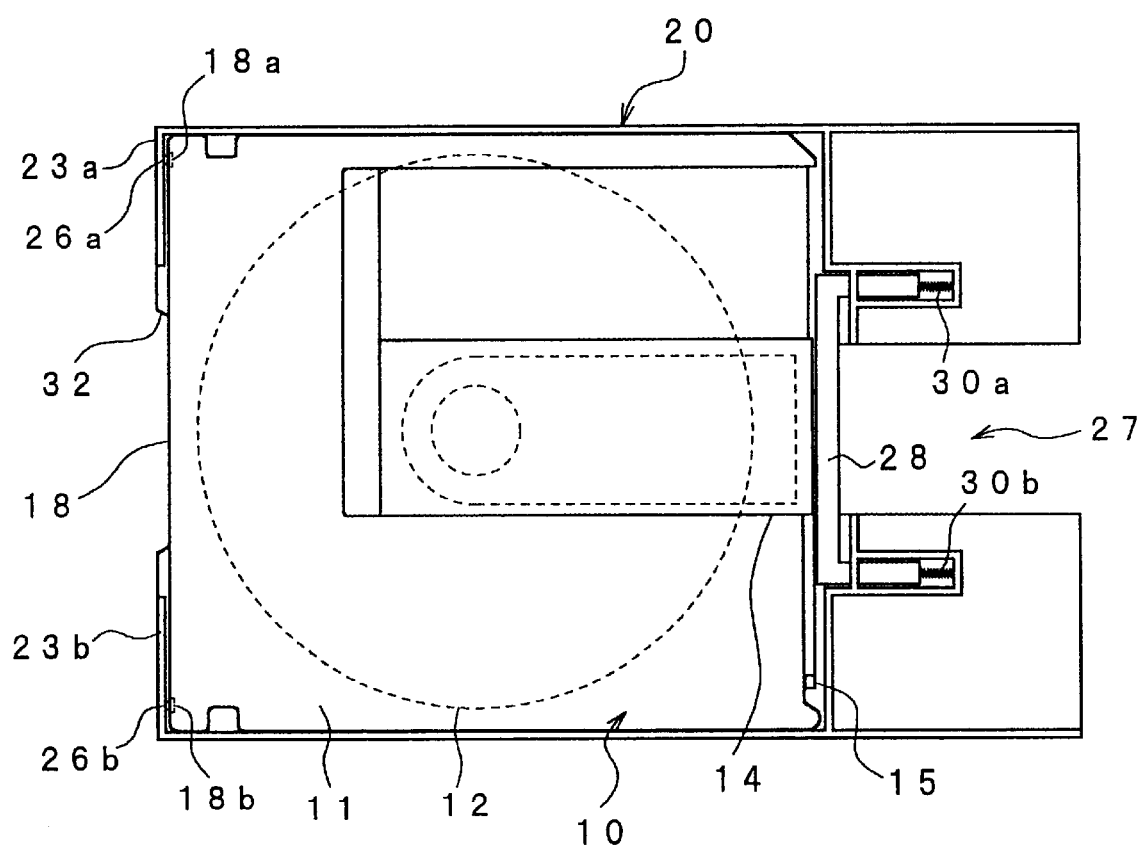
FIG. 11 is a plan view showing the disk cartridge loaded in the cartridge compartment.
Figure 12:
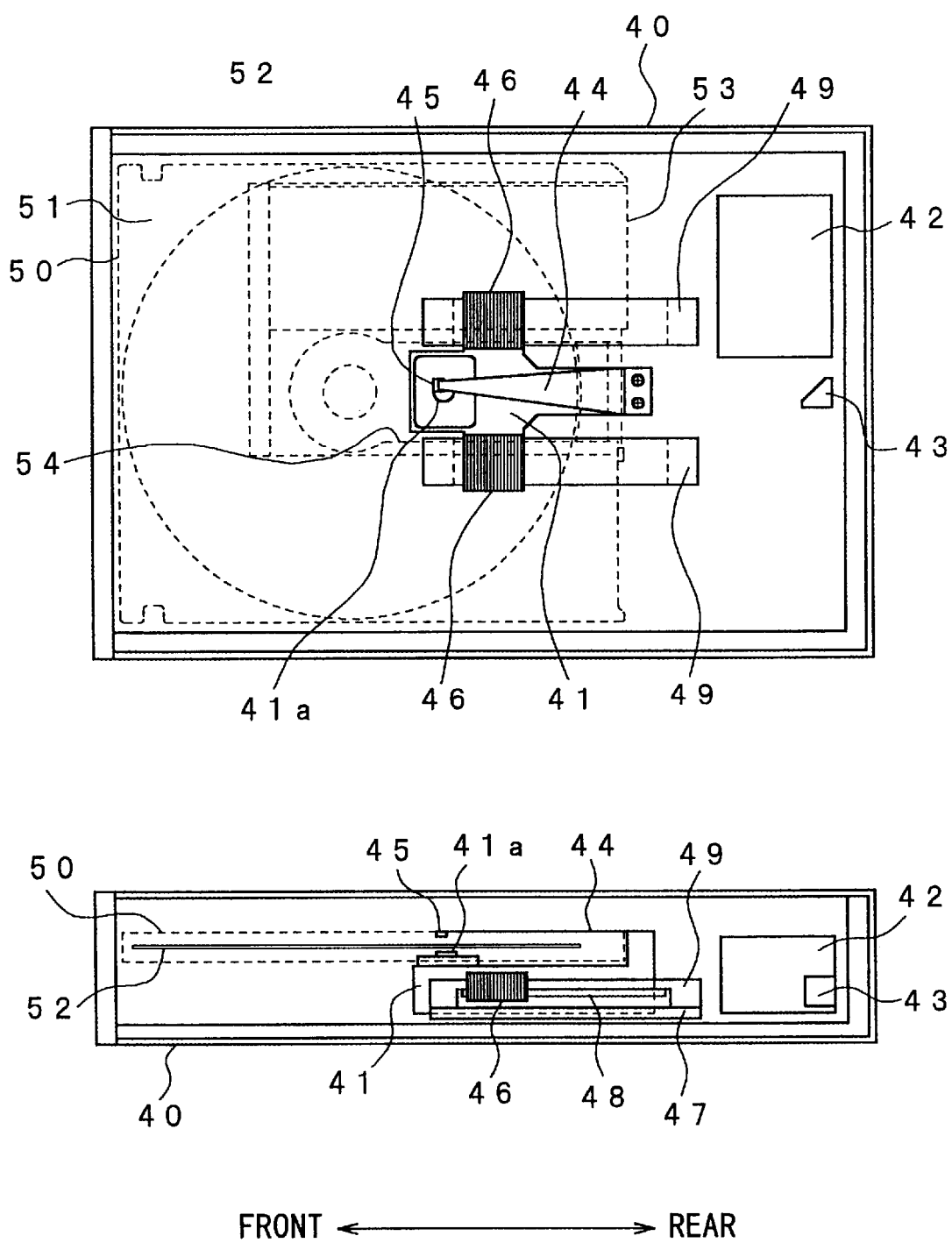
FIG. 12 is a schematic view showing, in the photo-magnetic disk driving device, the magnetic application head and the optical head that have moved to the innermost peripheral position of the photo-magnetic disk.

Also the disk cartridge 200 is provided with recesses 206b and 207b in the cutout recesses (gripper slots) 206a and 207a which are present in the side surfaces 206 and 207 of the cartridge housing 201; therefore, the external appearance of the device will never be impaired unlike the conventional disk cartridge 10 (FIG. 9) which has the recesses 18a and 18b in the rear face 18 constituting the outermost shape.

Figure 6:
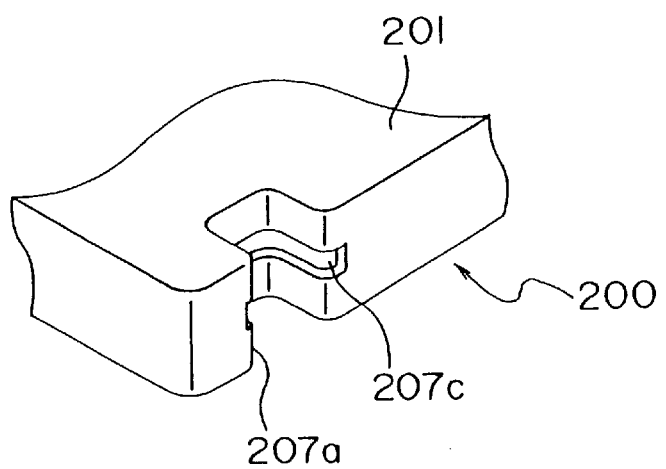
FIG. 6 is a view showing another example of the cartridge engaging recess provided in the cutout recess.

In the present embodiment described above was shown the disk cartridge provided with the recesses 206b and 207b in only one surface having the cutout recesses (gripper slots) 206a and 207a present in the side surfaces 206 and 207 of the cartridge housing 201. The recesses 206b and 207b may be provided continuously in two surfaces or in three surfaces. FIG. 6 shows an example provided with recesses (slots) 207c in three continuous surfaces.

Figure 7A:
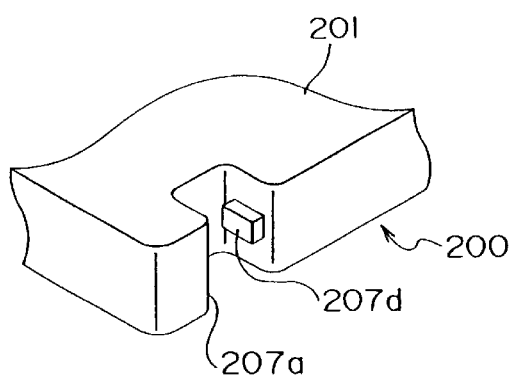
FIGS. 7A and 7B are views showing examples of a cartridge engaging projection provided in the cutout recess.
Figure 7B:
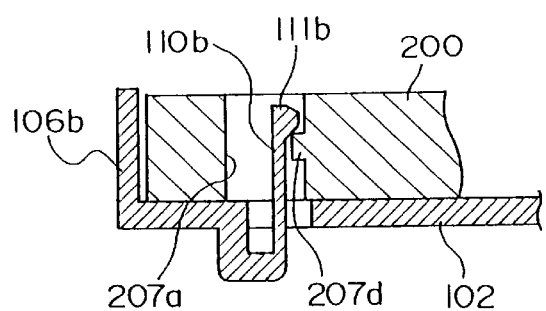
Figure 8A:
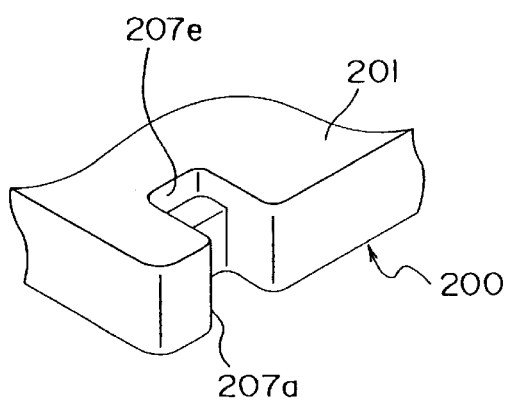
FIGS. 8A and 8B are views showing examples of a cartridge engaging recess provided adjacently to the cutout recess.
Figure 8B:
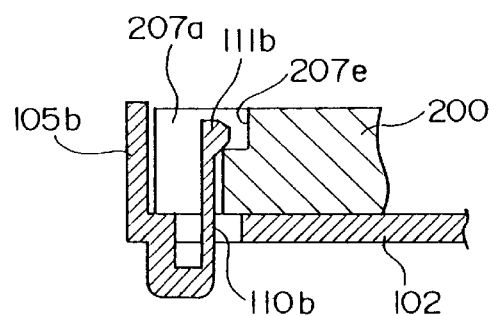

Also, as shown in FIG. 7A, a projection 207d may be provided in the cutout recess 207a. FIG. 7B shows an example of the cartridge in an engaged state of the projection, which makes basically no difference from the example provided with the recess. Furthermore, as shown in FIG. 8A, there may be provided a recess 207 in the upper surface side of the cartridge housing 201 adjacently to the cutout recess 207a. FIG. 8B shows the engaged state of the recess 207e.

Furthermore, the above-described embodiment shown is provided with the recesses 206b and 207b in the cutout recesses (gripper slots) 206a and 207a present in the side surfaces 206 and 207 of the cartridge housing 201. Separately from the gripper slots, similar cutout recesses may be provided in the side and rear faces of the cartridge housing 201, and also cartridge engaging recesses and projections may be provided in surfaces constituting the cutout recesses.

Also the above-described embodiment was applied to the photo-magnetic disk driving device; this invention, however, is similarly applicable to other disk driving devices designed to draw the disk cartridge as-loaded in the cartridge compartment into the device body.

According to the present invention, the cartridge 201 and the cartridge compartment 102 are so constituted as to engage the engaging portions 111a and 111b provided on the tip of the cartridge holding claws 110a and 110b protrusively provided on the front face side of the cartridge loading section 107 of the cartridge compartment 102 with the recesses 206b and 207b formed in the cutout recesses (gripper slots) 206a and 207a which are present in the side faces 206 and 207 of the cartridge housing 201. Therefore when the cartridge housing 201 is loaded from above in the cartridge loading section 107 of the cartridge compartment 102, the cartridge housing 201 can be mounted from above in the cartridge loading section 107 without moving the cartridge housing 201 back and forth within the cartridge loading section 107. That is, it is possible to make the longitudinal length of the cartridge loading section 107 of the cartridge compartment 102 nearly equal to the longitudinal length of the disk cartridge 200 by thus mounting the cartridge 201 in the cartridge compartment 102. Also it is possible to reduce the size of the compartment. Consequently the disk driving device body 101 can be reduced in size.

Furthermore, according to the present invention, cartridge engaging recesses or projections are provided in at least one surface constituting the cutout recess present in the cartridge housing of the disk cartridge; therefore the cartridge holding means can be mounted on the compartment without jutting out of the cutout recess when viewed from above. Thus it becomes possible to reduce the size of the disk driving device without increasing the size of the compartment more than needed. Also, a cartridge engaging recess or projection is provided in at least one surface which forms a cutout recess present in the cartridge housing. Since no recess is provided in the rear face which constitutes the outermost shape of the disk cartridge, the present embodiment has the advantage that the external appearance of the disk cartridge will not be impaired.

What is claimed is:

1. A disc drive apparatus for use with a disc cartridge, said disc cartridge having a cartridge housing for accommodating a disc and formed in a square shape, said cartridge housing also having an access window, a shutter movably mounted on one front side wall portion of said cartridge housing, said shutter being movable between a first position for closing said access window and a second position for opening said access window, a plurality of gripper slots formed on each of lateral side surfaces of said cartridge housing, said lateral side surfaces being perpendicular to said one front side wall portion, and recess portions formed on each of said plurality of gripper slots, said disc drive apparatus comprising:

a body having an inserting and ejecting port;

a movable cartridge compartment provided on said body, the movable cartridge compartment movable between an inside position of said body and an ejecting position of said body, the movable cartridge compartment having a loading recess portion and an opening, said opening formed on the bottom surface of said loading recess portion and, when said disc cartridge is loaded on said loading recess portion, being opposite said access window of said disc cartridge; and engaging portions formed on the movable cartridge compartment for engaging said recess portions of said disc cartridge when the disc cartridge is in a loaded state on the loading recess portion.

2. A disc drive apparatus for using a disc cartridge, said disc cartridge having a cartridge housing for accommodating a disc and formed in a square shape, said cartridge housing also having an access window, a shutter movably mounted on one front side wall portion of said cartridge housing, said shutter being movable between a first position for closing said access window and a second position for opening said access window, a plurality of gripper slots formed on each of lateral side surfaces of said cartridge housing, the lateral side surfaces being perpendicular to said one front side wall portion, and projections formed on each of said plurality of gripper slots, said disc drive apparatus comprising:

a body having an inserting and ejecting port;

a movable cartridge compartment provided on said body, the movable cartridge compartment movable between an inside position of said body and an ejecting position of said body, the movable cartridge compartment having a loading recess portion and an opening, said opening being formed on the bottom surface of said loading recess portion and, when said disc cartridge is loaded on said loading recess portion, being opposite said access window of said disc cartridge; and engaging portions formed on said movable cartridge compartment for engaging each of the projections when the disc cartridge is in a loaded state on the loading recess portion.

\* \* \* \* \*